United States Patent [19]

Van der Schoot

[11] 4,017,358
[45] Apr. 12, 1977

[54] BORON THERMAL REGENERATION SYSTEM

[75] Inventor: Martinus R. Van der Schoot, Dilbeek, Belgium

[73] Assignee: Westinghouse Electric Corporation, Pittsburgh, Pa.

[22] Filed: June 26, 1975

[21] Appl. No.: 591,781

Related U.S. Application Data

[63] Continuation of Ser. No. 359,054, May 10, 1973, abandoned, which is a continuation-in-part of Ser. No. 189,321, Oct. 14, 1971, abandoned.

[52] U.S. Cl. .................................. 176/65; 176/22; 176/39; 176/86 L; 210/35
[51] Int. Cl.² ..................................... G21C 15/08
[58] Field of Search ............... 176/39, 86 L, 22, 65; 210/35, 37

[56] References Cited

UNITED STATES PATENTS

| | | | |
|---|---|---|---|
| 3,378,450 | 4/1968 | Gramer et al. | 176/37 |
| 3,380,899 | 4/1968 | Loose | 176/65 X |
| 3,441,503 | 4/1969 | Smith | 210/35 |
| 3,664,950 | 5/1972 | Saraceno et al. | 210/35 |
| 3,666,626 | 5/1972 | Gramer et al. | 176/86 L |
| 3,898,467 | 8/1975 | Schukei et al. | 176/22 X |

Primary Examiner—Samuel Feinberg
Assistant Examiner—Peter A. Nelson
Attorney, Agent, or Firm—Z. L. Dermer; J. R. Campbell

[57] ABSTRACT

An ion exchanger which allows flow in both directions along a selected flow-path. A separator plate divides the exchanger tank into two chambers each of which has a flow-conduit so that flow may enter or leave from either chamber while prohibiting the resin particles from migrating from one side of the tank to the other. This ion exchanger permits a dual-directional flow-process to be practiced which results in immediate changes in the boron concentration within a nuclear reactor coolant system even if the ion-exchanger resins have not been completely equilibrated during a previous operation.

3 Claims, 4 Drawing Figures

BORON THERMAL REGENERATION SYSTEM

This is a continuation of application Ser. No. 359,054 filed May 10, 1973, now abandoned, which is a continuation-in-part of application Ser. No. 189,321 filed Oct. 14, 1971, now abandoned.

BACKGROUND OF THE INVENTION

This invention pertains to boron thermal regeneration systems, and more particularly to an ion exchanger for such a system and a method for operating same so as to allow rapid changes in the boric acid concentration in the reactor coolant system for load follow operations.

Presently contemplated chemical shim nuclear reactor systems will use ion exchangers to store or release an amount of borate ions which correspond to the change in boric acid concentration in the reactor coolant system during a load follow operation. The process removes boric acid from the reactor coolant system after a load reduction and stores it on the ion exchangers at relatively low temperatures. When needed, the stored boric acid can be returned to the reactor coolant system by raising the temperature of the anion exchangers. Because the amount of resin in the system is sized to accommodate the maximum required changes, the resin will therefore become saturated at the new temperature level after only a maximum change in concentration. For smaller changes in the reactor coolant boron concentration, the resin bed will not become completely saturated. Incomplete saturation of the resin results in a slow response of the system, after a change in operating temperatures of the resin, which makes the system unsuitable to follow load cycles other than the specific cycle for which it was designed.

In accordance with the prior art, dilution of the boric acid concentration in the reactor coolant was accomplished by sending the let-down flow, at relatively low temperatures, to the thermally regenerable ion exchangers. The water loses its content of boric acid which becomes stored on the resin. Water haivng a low concentration of boric acid thus leaves the ion exchangers and is sent back to the volume control tank from which the existing charging system returns the water to the reactor coolant system. The boration flow path through the ion exchanges was the same as during the dilution operation except that the temperature of the flow sent to the thermally regenerable ion exchangers was at a higher level. The water flowing through the ion exchangers would remove boron from the resins and the boron enriched water was returned to the reactor coolant system via the volume control tank and charging pumps.

The difficulty with the undirectional flow system of the prior art, as described above, was that the system was of extremely slow response where incomplete saturation of the resins resulted from a previous change in boron concentration. The system was thus unsuitable to follow loads other than load follow operations resulting in equilibration at a saturation level for the column. Moreover, this problem could not be solved by simply allowing flow reversal within the usual vertical column resin bed since a migration of the particles due to separation of the bed on flow reversal would make the results of any particular temperature change extremely unpredictable.

SUMMARY OF THE INVENTION

The slow response of unidirectional ion exchanges for use with a boron thermal regeneration system can be minimized by the use of resin beds which allow flow in both directions along a chosen flow-path. The resin column is utilized such that hot flow will always enter at one side of the resin bed and cold flow will always enter at the other side of the bed. This will, after reversal in flow direction, immediately result in a low effluent concentration at cold operating conditions and high effluent concentrations at hot operating conditions.

A resin tank suitable for practicing the above method of operating a boron thermal regeneration system could include a separator plate which vertically divides the ion exchanger tank into two chambers each of which has a flow conduit affixed in the bottom thereof. The separator plate does not extend to the top of the tank such that flow may pass over the top of this plate in either direction. Such a design minimizes particle migration during reversal of flow.

DESCRIPTION OF THE DRAWINGS

For a better understanding of the invention, reference may be had to the accompanying illustrative embodiment, in which.

DESCRIPTION OF THE PREFERRED EMBODIMENTS

Figure 2:
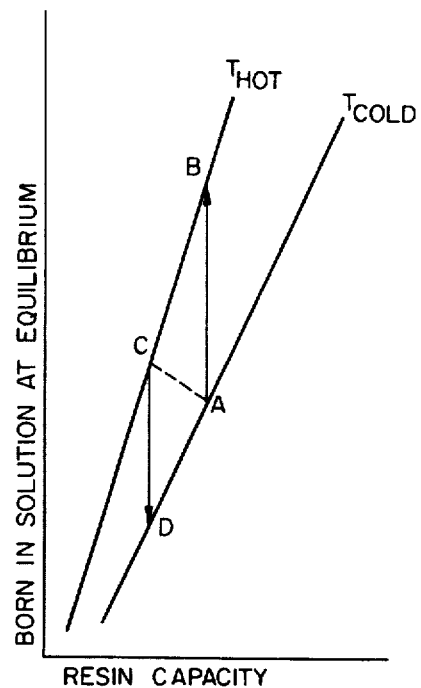
FIG. 2 graphically indicates the degree of boron storage within the resin bed at two preferable operating temperatures.

Referring to the drawings, FIG. 2 shows the storage capacity for borate ions on the resin for two different temperature levels as effected by the boric acid concentration of the liquid which surrounds the resin and the resins capacity for storage of boron. The curve of FIG. 2 represents conditions only where the resin is saturated with boron at the temperature represented on either the T-hot curve or the T-cold curve. Sketch W of FIG. 3 simulates the amount of boron stored on the resin during storage until saturation has been achieved. The effluent concentration equals the in-flow concentration under these conditions. Now assuming that the in-flow concentration, which is the reactor coolant concentration, corresponds to point A on the T-cold curve of FIG. 2. Boron will be released from the resin at hot in-flow conditions and yield a high effluent concentration as indicated by point B on the T-hot curve of FIG. 2. If the boration process is stopped before the reactor coolant system concentration reaches point C on the T-hot curve of FIG. 2, the concentration which would be achieved if the resin were completely equilibrated with the conditions of the incoming flow, then the boron on the resin would be distributed over the resin column as indicated in sketch X of FIG. 3. This results from the tendency of the resin bed to release boron first from the resins at the inlet side of the resin column. The boron concentration of the solution will then increase over the length of the resin column until it reaches a level corresponding to the equilibrium condition at that temperature.

Figure 3:
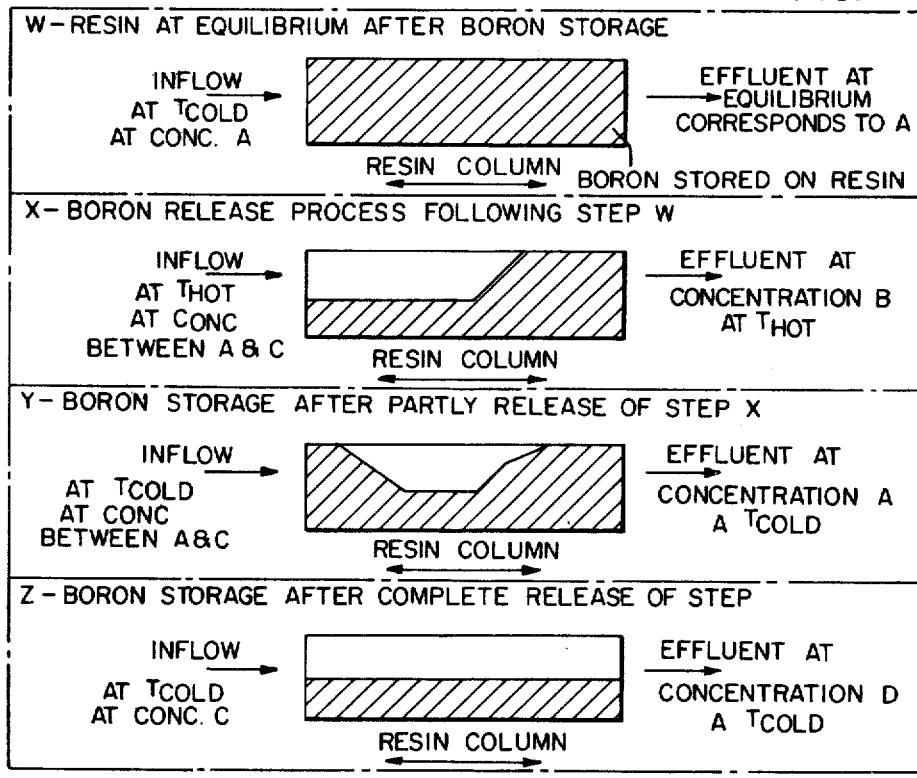
FIG. 3 shows various graphical depictions which indicate the effect of incomplete equilibration of the resin bed on out-flow concentration.

As indicated above, the outlet side of the resin column does not store or release boron during the initial phase of any particular change in flow condition directed toward changing the concentration of boron within the reactor. Sketch Y of FIG. 3 illustrates what would then happen if boron were subsequently stored on the resin before all of the boron had been released from the resin as for example as shown in sketch X of FIG. 3. The incoming flow stores boron first on the in-flow side of the resin column, as indicated above. The concentration of liquid decreases over the first part of the column. However, because the effluent side of the boron column has not released boron during the previous boration period, it will not be able to store boron at this in-flow condition. The flow which has decreased in concentration over the first part of the resin column will again increase over the last part of the column and will finally leave the resin column at a condition which is in equilibrium with the condition at which the resin was left after complete equilibrium which corresponds to point A of FIG. 2. The result is that no dilution of the reactor coolant water will occur during the first stage of the storage operation. This is of course extremely undesirable where rapid dilution is required for a subsequent step in reactor operations. The concentration of the effluent from the boron column will eventually decrease because the concentration of the liquid at the in-flow side decreases and removes boron which was stored at the effluent side. The amount of boron stored on the resin at the effluent side therefore decreases resulting eventually in a decrease in the effluent concentration. Thus, the result of leaving the column in a non-equilibrated state is that a substantial length of time is required to reach a desired effluent concentration from the boron column. A sketch Z of FIG. 3 illustrates the case where boron is stored on the resin after the resin column has been completely rinsed at hot conditions. The effluent concentration during boron storage will then correspond to point D on the T-cold curve of FIG. 2. This low effluent concentration would cause an immediate dilution of the reactor collant water.

The explanation above indicates that in a single directional flow resin column the resin must become equilibrated at the new temperature level in order to give any immediate response if the temperature of the resin bed is changed. A severe operational problem results since partial changes in the reactor coolant concentration of boron with respect to the storage capacity of the boron column make subsequent changes both somewhat unpredictable and always time consuming.

This operational problem can be minimized by the use of the resin bed which allows flow in both directions. FIG. 2 illustrates that if the flow direction would have been reversed after the conditions shown on sketch X of FIG. 3 then a low concentration corresponding to point D on the T-cold curve would have been reached immediately. Accordingly, the resin bed should always be used such that hot flow which removes boron from the resin will always enter at one side of the bed and cold flow which stores boron on the resin will always enter at the other side of the bed. This will, after reversal in flow condition from a hot condition to a cold condition, immediately result in a low effluent concentration at cold operating conditions and a high effluent concentration at hot operating conditions.

The resins used in the regeneration system disclosed herein are hydroxyl based anion resins which normally are saturated with borate ions prior to being placed in the system tanks. Typical resins available for use are Rohm and Haas IRN-78, Duolite ARA-336W, Lewatit M-500 and Ionac-A935. These resins are well known in the nuclear reactor manufacturing field and all appear to have essentially the same characteristics. They deteriorate somewhat with use but pronounced deterioration takes place above about 160° F and this factor determines the upper temperature level at which the thermally regenerable ion exchangers having the resin beds may be operated. The upper temperature level at which coolant may therefore be introduced into the ion exchangers ranges between 140° and 160° F while the lower temperature level is 40° to 60° F. The lower level of 40° F is chosen to maintain the coolant at just above the freezing point to eliminate the necessity for using an anti-freeze solution in the coolant. Desirably, the range between the upper and lower temperature levels should be kept as wide as possible to promote efficiency in the system, i.e., to store boron on the resin and remove boron from the resin in the maximum amount and at the best rate for the temperatures chosen for system operation. The system of this invention operates at 50° and 140° F.

It will be obvious to those skilled in the art that as improved resins become commercially available, the upper temperature level may be raised from the present 140° – 160° F, the object being to achieve the greatest range between the points B and D on the curve of FIG. 2.

Figure 4:
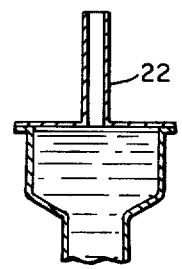
FIG. 4 illustrates the design of a tank lid used when the tank is charged with a resinous composition.
Figure 1:
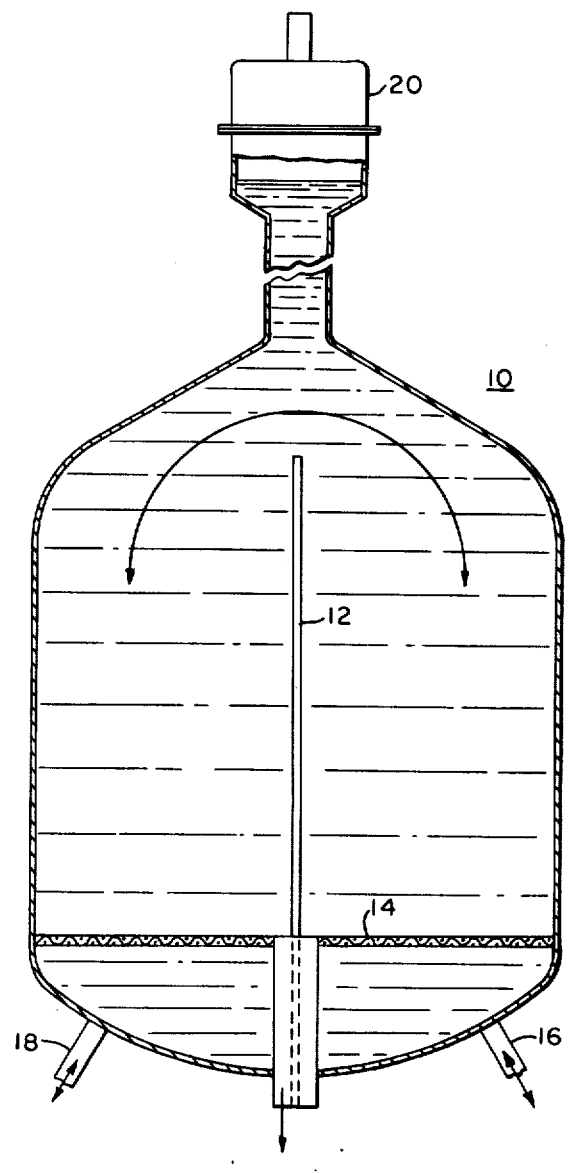
FIG. 1 shows an ion exchanger tank suitable for use in a dual-directional boron thermal exchange system.

FIG. 1 shows an example of a resin tank which is suitable for practicing the process of this invention in that it permits dual-directional flow. Tank 10 is bisected by a vertical divider plate 12 which extends through a horizontal screen 14. Tank 10 further includes bottom mounted flow conduits 16 and 18. Flow which enters through conduit 16 under the resin screen 14 at one side of the divider plate 12 is forced upwards over the divider plate 12 and exits via the conduit 18 on the other side of the divider plate 12. The reverse flow path is followed after flow-reversal. The resin located in the upward flow path will be lifted a few inches. However, the divider plate 12 assures that the resins are not intermixed after flow reversal.

Tank 10 employs two different tank lids designated by the numerals 20 and 22 in order to properly adjust the resin level within the tank. Resin lid 20 is employed during initial filling. The properties of the employed resin are such that during storage of borate ions, during which time relatively low temperature coolant is passing through the resin column, the resin volume shrinks approximately 10%. This 10% is added employing resin tank lid 22 which is subsequently replaced by resin lid 20 to insure that during operation there is always space in the tank available for expansion and contraction of the resins.

An advantage of the design exemplified is that flow which enters the resin tank at one side will precool (if the previous operation was release of boron at relatively high temperatures) or preheat (if the previous operation was storage of boron at relatively low temperatures) the liquid which leaves the column on the other side of the divider plate 12. This will cause a faster response than would be possible with other arrangements.

The use of dual-directional flow process for boron storage and release in conjunction with a resin tank 10 specifically designed to practice this process enables a wide variety of load follow operations to be practiced in a minimum time. The system of this invention should be contrasted with previous systems which only allowed fixed changes to take place during acceptable time periods.

I claim as my invention:

1. A process for reversibly changing the boric acid concentration in coolant circulated through a nuclear reactor coolant system comprising the steps of:

removing coolant having a first concentration of boron therein from the reactor coolant system;

reducing the temperature of the removed coolant to a first lower level;

conveying the reduced temperature coolant in a forward direction through a tank charged with ion exchange resins to remove boron from the resins and thereby increase the concentration of boron in said removed coolant;

returning said removed coolant having increased boron concentration to the reactor coolant system; and thereafter;

again removing and reducing the temperature of coolant from the reactor coolant system to a second level lower than said first level;

conveying the second temperature level coolant in a reverse flow direction through said tank to deposit boron on said resins and thereby decrease the concentration of boron in the second temperature level coolant; and returning said second temperature level coolant having a decreased concentration of boron therein to the reactor coolant system;

continuing the circulation of said reduced temperature coolant and the second temperature level coolant respectively through the tank until an equilibrium is established between the concentration of boron and the temperature of said coolants.

2. The process according to claim 1 wherein the reduced temperature coolant always flows into one end of said tank and upwardly over a baffle therein and then down the other side thereof to the outlet on the same side of the tank, thereby removing boron from the resins therein; and the second temperature level coolant always flows in the reverse direction through said tank for depositing boron on said resins.

3. A process for reversibly changing the boric acid concentration in coolant circulated through a nuclear reactor coolant system comprising the steps of:

removing coolant having a first concentration of boron therein from the reactor coolant system;

reducing the temperature of the removed coolant to a first lower level;

conveying the reduced temperature coolant in a forward direction through a tank charged with ion exchange resins to remove boron from the resins and thereby increase the concentration of boron in said removed coolant;

discharging said removed coolant having increased boron concentration to a first coolant container; and thereafter;

again removing and reducing the temperature of coolant from the reactor coolant system to a second level conveying the second temperature level coolant in a reverse flow direction through said tank to deposit boron on said resins and thereby decrease the concentration of boron in the second temperature level coolant; and discharging said second temperature level coolant having a decreased concentration of boron therein to a second coolant container;

continuing the circulation of said reduced temperature coolant at said reduced temperature level and the second temperature level coolant at said second level temperature respectively, back and forth repeatedly through the ion exchange tank and between said containers to provide coolant having a high concentration of boron in the first coolant container, and coolant having a low concentration of boron in the second coolant container.

* * * * *